United States Patent [19]

Reesor

[11] Patent Number: 4,472,720
[45] Date of Patent: Sep. 18, 1984

[54] AREA NAVIGATIONAL SYSTEM USING GEOSYNCHRONOUS SATELLITES

[76] Inventor: Thomas W. Reesor, 332 Plant Ave., Tampa, Fla. 33606

[21] Appl. No.: 133,005

[22] Filed: Mar. 24, 1980

[51] Int. Cl.³ ............................................... G01S 1/30
[52] U.S. Cl. .................................... 343/388; 343/356; 343/394
[58] Field of Search .............. 343/100 ST, 103, 105 R

[56] References Cited

U.S. PATENT DOCUMENTS

| | | | |
|---|---|---|---|
| 2,986,732 | 5/1961 | Marshburn | 343/105 R |
| 3,150,372 | 9/1964 | Groth, Jr. | 343/105 R X |
| 3,430,234 | 2/1969 | Wright | 343/105 R X |
| 3,852,750 | 12/1974 | Klein | 343/105 R |

*Primary Examiner*—T. H. Tubbesing
*Attorney, Agent, or Firm*—Stefan Stein

[57] ABSTRACT

An area navigational system using geosynchronous satellites is disclosed. The navigational system comprises a master satellite and seven slave satellites uniformly disposed in geosynchronous orbit above the equator of the earth. The master satellite comprises a master tone oscillator producing a reference tone which is transmitted to the immediate neighboring slave satellites which in turn, serially relays the reference tone to the remaining slave satellites such that each slave satellite receives the reference tone. Each slave satellite comprises a slave tone oscillator which is synchronized by the reference tone to be in phase with the phase of the master tone oscillator. The output of the master tone oscillator and the slave tone oscillators are frequency modulated and transmitted to the earth. A receiver on a mobile craft receives three of such transmissions and demodulates the carrier frequencies to recover the three tones. The phases of the tones are compared with one another to obtain two hyperbolic lines of positions whose intersection defines the position of the mobile craft. The foregoing abstract is merely a resume of one general application, is not a complete discussion of all principles of operation or applications, and is not to be construed as a limitation on the scope of the claimed subject matter.

12 Claims, 14 Drawing Figures

AREA NAVIGATIONAL SYSTEM USING GEOSYNCHRONOUS SATELLITES

BACKGROUND OF THE INVENTION

This invention relates to navigational systems. More particularly, this invention relates to navigational systems comprising a series of satellites positioned in geosynchronous orbit above the earth which transmits a radio carrier modulated by a tone to be received by mobile craft to obtain a geographical fix.

Presently there exist many different types of navigational systems which provide a means for a mobile craft to obtain a geographical fix on the surface of the earth. U.S. Pat. No. 3,384,891 (Anderson) discloses a navigational system having a ground station which transmits ranging signals to a satellite which, in turn, retransmits such signals to the mobile craft and the ground station. The mobile craft repeats the ranging signals received from the satellite and retransmits them to the satellite which, in turn, retransmits them to the ground station. The ground station receives both the transmissions of the repeated ranging signals from the satellite and measures the time interval therebetween. From this time interval, the ground station computes the range from a known position of the satellite to the mobile craft. The same interrogation message is transmitted from the ground station to a second satellite at a different location to obtain two computed ranges from the mobile craft to two known positions of the satellites. The two range measurements using two different satellites provides two circles whose intersection is the position of the mobile craft.

The method of repeating ranging signals to obtain a geographical fix requires an interrogation signal to be transmitted by the mobile craft. Such interrogation reveals the position of the mobile craft to others, and thus is undesirable. The ranging method also requires a transmitter to be placed on the mobile craft. The requirement of such a transmitter increases the cost and reduces the reliability of the navigational system and is therefore also undesirable.

A further disadvantage of the ranging method is the possibility of an overload condition due to each satellite receiving interrogation signals on the same frequency from numerous mobile craft. Such an overload condition reduces the accuracy of the system and could possibly cause some mobile craft to lose complete navigational reference.

To obviate the need for an interrogation signal, subsequent prior art navigational systems utilized synchronized transmitters placed at known positions around the world. The transmitters transmit frequencies having the same phase. The mobile craft receives such frequencies and compares the phase difference therebetween to obtain a geographical fix. For example, a position locating system known as OMEGA, has been developed by the U.S. Navy and is described in detail in a publication entitled "OMEGA, a World-Wide Navigational System", prepared by the OMEGA Implementation Committee and published by Pickard & Burns Electronics, 103 4th Avenue, Waltham, Mass. In the OMEGA System, a plurality of transmitters located in terrestrial stations at known points around the surface of the earth transmit a sequential signal that switches between three primary frequencies. The several transmitters are synchronized so that at any particular instance of time, only one transmitter emits a continuous wave signal at a particular frequency. During succeeding intervals of time, the transmitter frequencies are shifted whereby the frequency transmitted from the first station during the first interval is transmitted from succeeding stations during succeeding intervals. Each terrestrial transmitter contains oscillators which are phase-locked to a standard time, common to all terrestrial stations, to enable all terrestrial transmitters to transmit with a common phase.

Conventional OMEGA receiving equipment designed for use by mobile craft generally contains stable oscillators which are individually phase-locked to the separate OMEGA signals received from three different terrestrial stations. The equipment determines the position of the mobile craft by measuring the phase difference between the pairs of these phase-locked oscillators. Each measured phase difference corresponds to a difference in the distance between two terrestrial transmitters, and thus locates the mobile craft on a hyperbolic line of position on an OMEGA navigation chart, as is well known in the art. Phase measurements made between each different pairs of oscillators locate the mobile craft on the different hyperbolic lines of position, which intersect to identify the position of the mobile craft on the chart.

Other navigational systems use techniques for determining the position of the mobile craft in a manner similar to the OMEGA System. For example, U.S. Pat. No. 3,789,409 (Easton) describes a navigational system comprising a series of satellites which transmit multifrequency signals derived from the same oscillator. The stable oscillator is phase synchronized with the receiver equipment on the mobile craft. The equipment computes the phase differences between the signals received from the satellites and the signals produced within the receiver to determine the distance between the mobile craft and the satellites. Hyperbolic lines of positions can then be plotted, and the position of the mobile craft determined.

A major problem associated with the above systems is the necessity of synchronizing the phase of the receiver equipment signals to the phase of the transmitter equipment. Atomic clocks are being utilized to help overcome such a problem. More particularly, the Easton patent and U.S. Pat. No. 3,643,259 (Enter) incorporate an atomic clock to provide such synchronization. It is readily apparent that a momentary failure of either the atomic clock in the receiver equipment on the mobile craft or in the transmitter equipment will render the system inoperable. Furthermore, the phase drift inherent in atomic oscillators would also render the system inaccurate. Thus, such a volatile and unstable system is most undesirable.

Therefore it is an object of this invention to provide an apparatus and method which overcomes the aforementioned inadequacies of the prior art devices and methods and provides an improvement which is a significant contribution to the advancement of the navigational system art.

Another object of this invention is to provide a navigational system wherein the transmitter equipment does not interrogate the receiver equipment on the mobile craft and thus does not reveal the position of the mobile craft.

Another object of this invention is to provide a navigational system which eliminates the overload conditions associated with ranging methods utilizing interrogation signals.

Another object of this invention is to provide a navigational system which obviates the need for atomic clocks to provide synchronization of the transmitter equipment and the receiver equipment on the mobile craft.

Another object of this invention is to provide a navigational system which is not volatile to loss of power or loss of synchronization.

Another object of this invention is to provide a navigational system for long distance navigation of mobile craft around the world.

Another object of this invention is to provide a navigational system for both surface mobile craft and airborne mobile craft.

Another object of this invention is to provide a navigational system which overcomes the altitude error associated with airborne mobile craft.

The foregoing has outlined some of the more prominent objects of the invention. These objects should be construed to be merely illustrative of some of the more prominent features and applications to the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention may be incorporated into a navigational system for determining the position of a mobile craft on the earth. The navigational system comprises a plurality of satellites, preferably eight satellites, which are uniformly positioned in geosynchronous orbit about the equator of the earth. The transmissions from each satellite comprise a radio carrier which is modulated by one or more tones, each carrier being of a different frequency for each satellite. In determining the position of a mobile craft, the receiver placed on the craft receives transmissions from two of the satellites and demodulates the carrier to recover a first and a second tone. The phases of the two tones are compared with each other to define a hyperbolic line of position (LOP) on the surface of the earth. Simultaneously, the receiver on the craft receives transmissions from a third satellite and similarly demodulates the carrier to recover a third tone. The phase of the third tone is similarly compared with either the first or the second tone to define a second hyperbolic LOP on the surface of the earth. The intersection of these two hyperbolic LOPs enables the mobile craft to obtain a geographical fix on the earth. It is noted that the intersections of the two hyperbolic LOPs actually define two fixes; one north of the equator and one south of the equator. Normally, however, such an ambiguity between the north and south latitudes is insignificant for most navigational purposes.

It should be evident that the phases of the tones must be synchronized with one another. Accordingly, the navigational system comprises a means to accurately control the phase timing of each of the tones transmitted by each satellite. In the first embodiment, the phase control means comprises a master tone oscillator located on one of the satellites, hereinafter called the master satellite. The master satellite transmits a reference tone produced by the master tone oscillator to the two neighboring satellites, hereinafter called the slave satellites. Each of the slave satellites then relays the reference tone to their neighboring slave satellite. This procedure is continued until all seven of the slave satellites have received the reference tone. Due to the geosynchronous orbits of the satellites, the distance between each of the satellites is known, and thus the phase of the reference tones received by each of the slave satellites is adjusted accordingly to have identical phases. Each satellite is therefore able to transmit a different carrier frequency which is modulated by reference tones being in phase with one another.

The navigational system may comprise a second embodiment of the means to accurately control the phase timing of each of the tones transmitted by each satellite. This second embodiment may comprise a plurality of ground stations which correspond to the plurality of satellites. The ground stations receive transmissions from the satellites and compare the phases of the transmitted tones with a reference tone. If the tones are not identically in phase, the ground stations transmit a correction signal to the satellite for correction of the phase of the transmitted tone. The phases of the transmitted tone from the satellites would then be synchronized with one another. The mobile craft is then able to obtain a geographical fix by receiving transmissions from at least three of the satellites and comparing the phases therebetween.

Due to the gravitational force exerted on the satellite from the moon, the satellites may drift from their geosynchronous orbit above the earth. A means to correct such drifting may be incorporated into the invention. More particularly, the drift correction means may be utilized in conjunction with the first embodiment of the phase control means discussed previously. The drift correction means comprises a receiver located on the surface of the earth which receives transmissions from at least two satellites. A comparator compares the phase of such transmissions with a position reference to produce an error signal. An error correction computer receives the error signal and computes a correction signal which is transmitted to a correction receiver located on the master satellite. The correction receiver utilizes such a correction signal to reposition the satellites in their proper orbit. The means for repositioning the satellites is well known in the art and may comprise positioning rockets which are actuated to force the satellites back into the proper geosynchronous orbit.

From the foregoing discussion, it is evident that a novel method of obtaining a geographical fix has been disclosed. More particularly, the receiver located on the mobile craft is tuned to three frequencies to receive transmissions from three of the satellites. Upon receiving the transmissions, the receiver of the mobile craft demodulates the carrier frequencies to obtain the reference tones. The phases of the tones are then compared to obtain two geographical LOPs. A position computer computes the intersection of the geographical LOPs and displays the intersection in terms of longitude and latitude.

It should be apparent that in the case of an airborne mobile craft, the craft will appear to be at a higher latitude as seen from the satellites than when the craft is on the surface of the earth. This error is approximately equal to A (tan φ), where A equals the aircraft's altitude and φ equals the aircraft's latitude. Accordingly, the error may be compensated by a tangent computer which computes the tangent of the latitude signal received from the position computer mentioned previously. The tangent computer then provides such signal to an altitude error computer. Simultaneously, an altitude error computer receives an altitude signal from an encoding altimeter located on the aircraft. The altitude error computer then multiplies the altitude signal with the output of the tangent computer. An error corrector subtracts the signal from the altitude error computer from the latitude signal received from the position computer. The resulting corrected latitude signal along with the longitude signal is then displayed by the display means mentioned previously.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DISCUSSION

Figure 1:
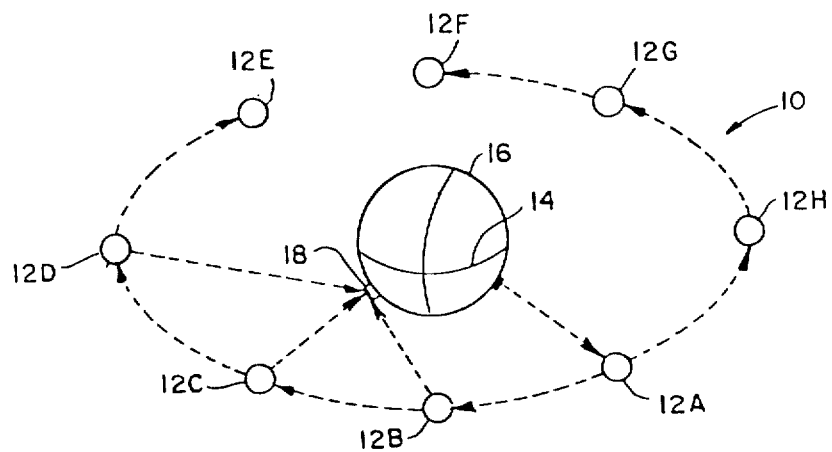
FIG. 1 is a perspective view of the satellites of the navigational system disposed uniformly in geosynchronous orbit above the equator of the earth.

This invention is a navigational system 10 which comprises a plurality of satellites 12, preferably eight satellites 12A, 12B, 12C, 12D, 12E, 12F, 12G and 12H, which are uniformly positioned in geosynchronous orbit about the equator 14 of the earth 16. A mobile craft 18 determines its position relative to the earth 16 by receiving transmissions from three of the satellites 12. FIG. 1 illustrates the first embodiment of the navigational system 10 wherein the mobile craft 18 receives transmissions from the three satellites 12B, 12C and 12D. Each transmission comprises a radio carrier which is modulated by one or more tones. Hence, the receiver on the mobile craft 18 is tuned to receive each of the three different frequencies from the satellites 12B, 12C and 12D. Furthermore, each of the tones which modulates the carrier frequencies is synchronized to have identical phases.

To determine the position of the mobile craft 18, the receiver located on the mobile craft 18 receives transmissions from the satellites 12B and 2C. The receiver demodulates the tones from such transmissions and compares the phase difference therebetween. Such phase difference defines a first hyperbolic line of position (LOP) 20 on the surface of the earth 16. Similarly, the receiver on the mobile craft 18 receives transmissions from the satellites 12C and 12D, demodulates the tones contained therein, and compares the phase difference therebetween to define a second hyperbolic LOP 22.

Figure 2:
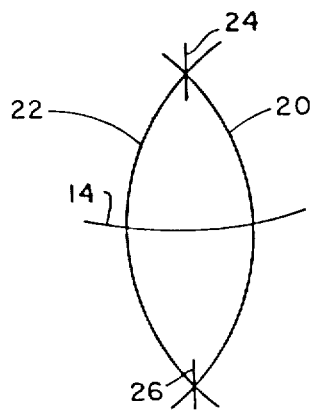
FIG. 2 illustrates the intersection of the hyperbolic lines of positions on the surface of the earth.

As shown in FIG. 2, the intersections of the first and the second hyperbolic LOPs 20 and 22 define two geographical fixes; one fix 24 north of the equator 14 and a second fix 26 south of the equator 14. The position of the mobile craft 18 is therefore determined provided the mobile craft 18 already knows whether it is north or south of the equator 14.

Figure 3:
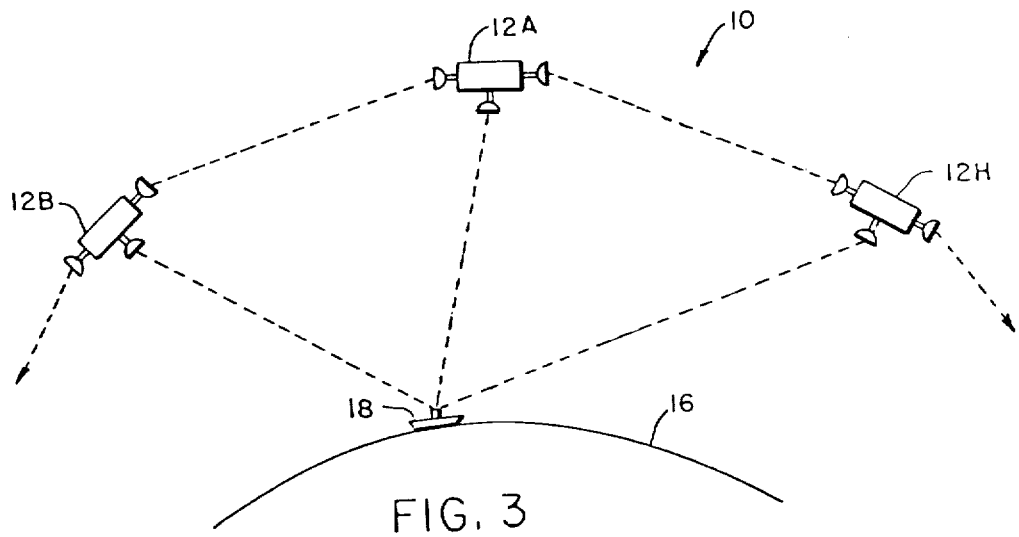
FIG. 3 is a plan view of the first embodiment of the phase control means.
Figure 4:
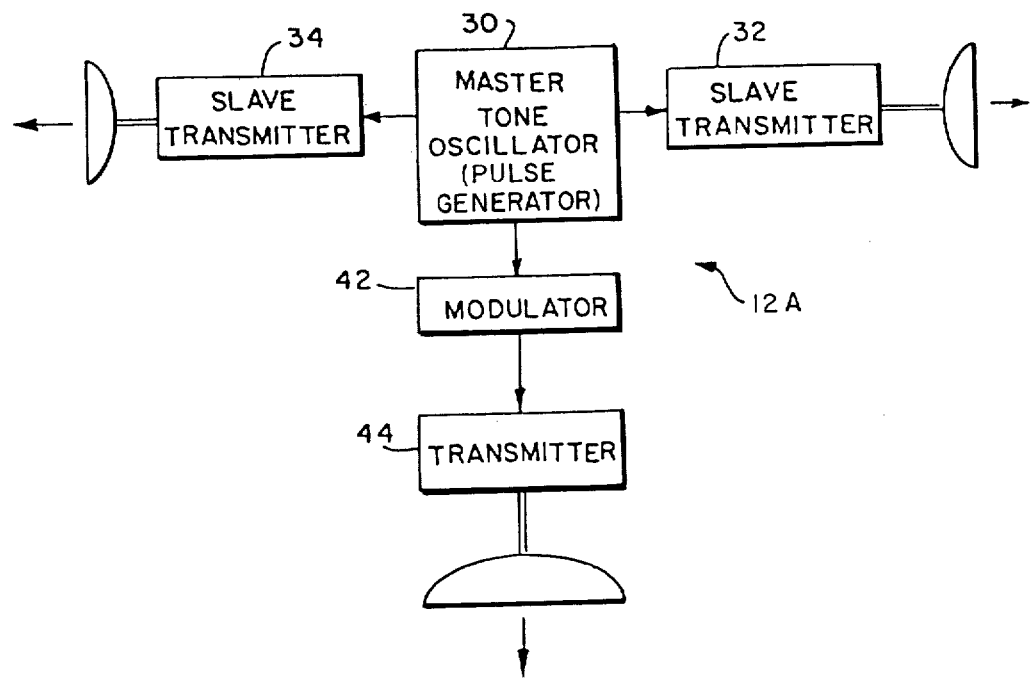
FIG. 4 is a block diagram of the electrical components of the master satellite.

As noted earlier, the phases of the tones must be synchronized with one another. Accordingly, the navigational system 10 comprises means to accurately control the phase of each of the tones transmitted by each of the satellites 12. Referring to FIG. 1, FIG. 3 and FIG. 4, the first embodiment of the phase control means comprises a master tone oscillator 30 located on one of the satellites 12, hereinafter called the master satellite 12A. The master tone oscillator 30 produces a reference tone which is used to synchronize the phase of the tones which modulates the radio carrier frequencies of the remaining seven satellites 12B, 12C, 12D, 12E, 12F, 12G and 12H, hereinafter called slave satellites. More particularly, the master satellite 12A comprises two slave transmitters 32 and 34 which transmit the reference tone to the neighboring slave satellites 12B and 12H, respectively.

Figure 5:
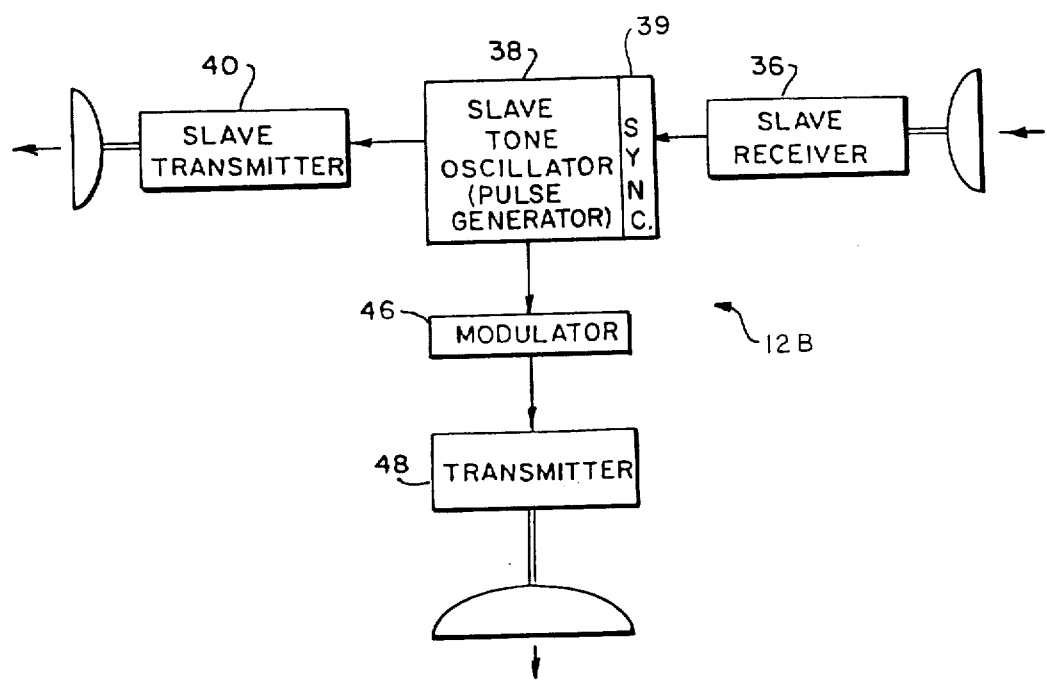
FIG. 5 is a block diagram of the electrical components of the slave satellites.

FIG. 5 shows a block diagram of the electrical components of each of the slave satellites 12B, 12C, 12D, 12E, 12F, 12G and 12H. By way of illustration, with FIG. 5 representing the electrical components of slave satellite 12B, a slave receiver 36 receives the reference tone transmitted by the slave transmitter 34 and produced by the master tone oscillator 30. The reference tone is provided to a phase synchronizer 39 which synchronizes the slave tone oscillator 38 with the master tone oscillator 30. It is noted that because the distance between the master satellite 12A and the slave satellite 12B is known, the propagation delay of the transmission from the master tone oscillator 30 can be determined. The phase of the reference tone received by the slave receiver 36 can thus be compensated accordingly such that the reference tone supplied to the phase synchronizer 39 is identical to the phase of the reference tone produced by master tone oscillator 30.

The reference tone received by the slave satellite 12B is transmitted by a slave transmitter 40 to a neighboring slave satellite 12C. Slave satellite 12C comprises electrical components as shown in FIG. 5, and thus receives the reference tone transmitted by slave satellite 12B and relays such reference tone to the next neighboring satellite 12D. Likewise, slave satellite 12D receives the reference tone transmitted by slave satellite 12C and relays the reference tone to slave satellite 12E.

In a similar fashion, slave transmitter 32 of the master satellite 12A transmits the reference tone from the master tone oscillator 30 to slave satellite 12H. Slave satellite 12H relays the reference tone to slave satellite 12G which, in turn, relays the reference signal to slave satellite 12F. All of the slave satellites 12B, 12C, 12D, 12E, 12F, 12G and 12H, therefore receives the reference tone produced by the master tone oscillator 30. The slave tone oscillator 38 in each of the slave satellites 12B, 12C, 12D, 12E, 12F, 12G and 12H are thus synchronized with one another by means of their phase synchronizer 39 to produce tones having identical phases.

The output of the master tone oscillator 30 of the master satellite 12 is frequency modulated by modulator 42 and then transmitted by transmitter 44 to the earth 16. In a similar manner, the outputs of each of the slave tone oscillators 38 in each of the slave satellites 12B, 12C, 12D, 12E, 12F, 12G and 12H are frequency modulated by modulator 46 and transmitted by transmitter 48 to the earth 16.

Figure 6:
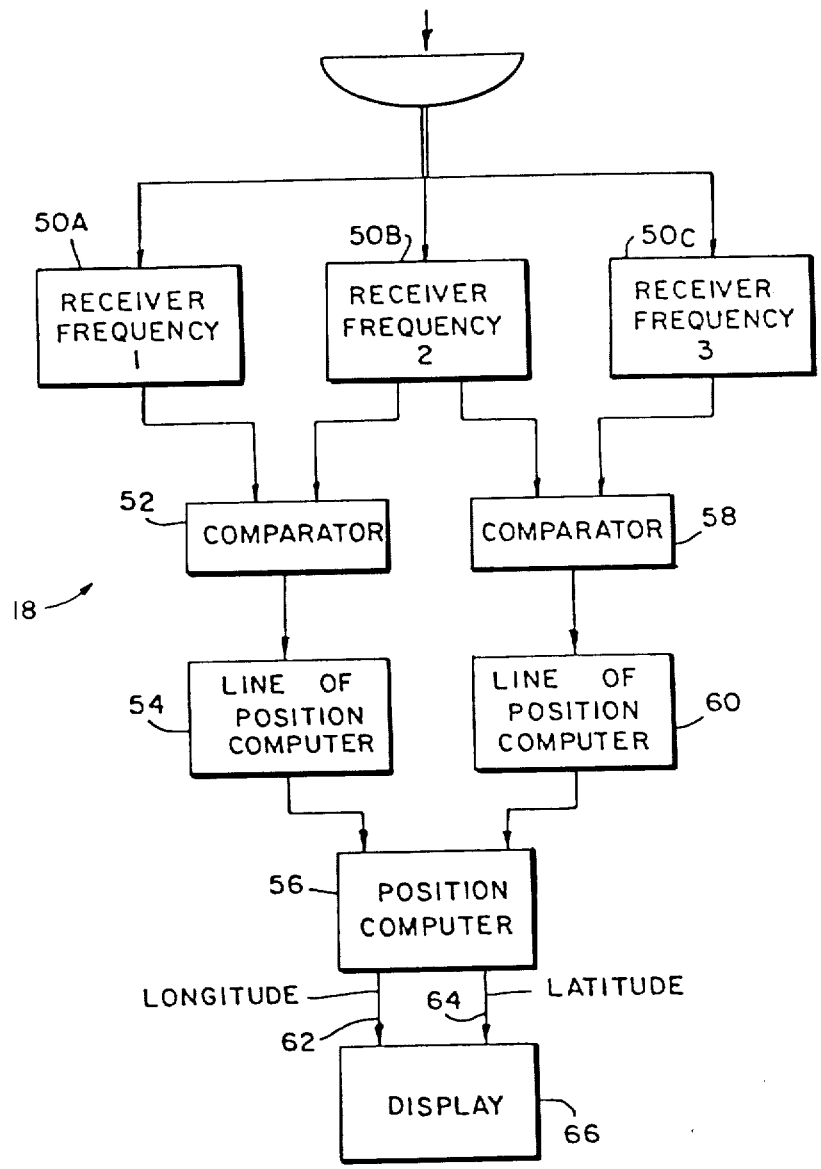
FIG. 6 is a block diagram of the electrical components of the receiver equipment located on the mobile craft.

As noted earlier, the mobile craft 18 receives transmissions from three of the satellites 12 to define two geographical LOPs to obtain a geographical fix on the earth 16. FIG. 3 illustrates, by way of example, the mobile craft 18 receiving transmissions from the master satellite 12A and slave satellites 12B and 12H. The receiver equipment which receives and determines the geographical LOPs is shown in FIG. 6. More particularly, the receiver equipment comprises three receivers 50A, 50B and 50C which are respectively tuned to receive the radio carrier transmitted by satellites 12H, 12A and 12B. Receivers 50A and 50B demodulate the radio carrier from satellites 12H and 12A to recover a first and a second tone. The phases of the two tones are then compared by means of a phase comparator 52. The difference in the phases are then supplied to a computer 54 to compute a first hyperbolic LOP. The output of computer 54 is then supplied to a position computer 56. Similarly, the receiver 50C demodulates the radio carrier received from satellite 12B to recover a third tone. The phases of the second and third tones are then likewise compared by means of comparator 58. The difference in the phases are then supplied to a computer 60 which computes a second hyperbolic LOP. The output of computer 60 is supplied to position computer 56. The position computer 56 determines the intersection of the first and second hyperbolic LOPs and transforms such intersection in terms of a longitude signal 62 and a latitude signal 64. A display means 66 receives the longitude and latitude signals 62 and 64 and displays such signals numerically. The position of the mobile craft 18 is thus determined in terms of latitude and longitude.

Figure 7:
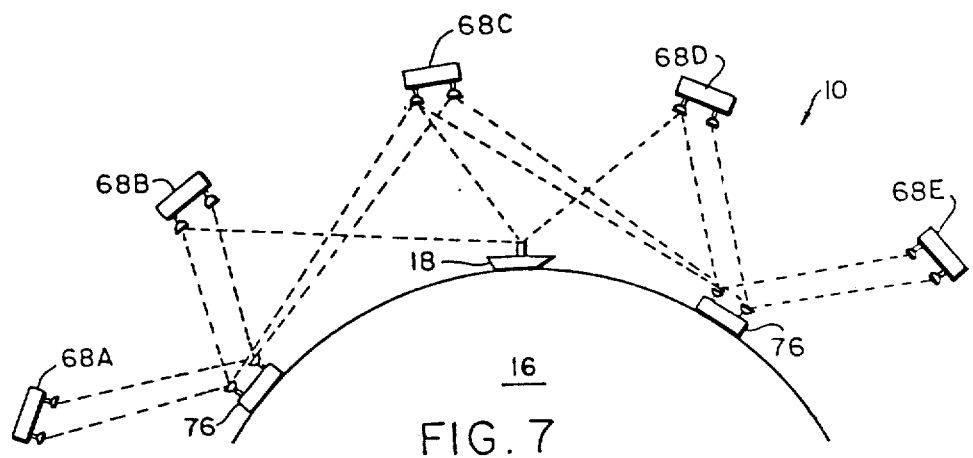
FIG. 7 is a plan view of the second embodiment of the phase control means.
Figure 8:
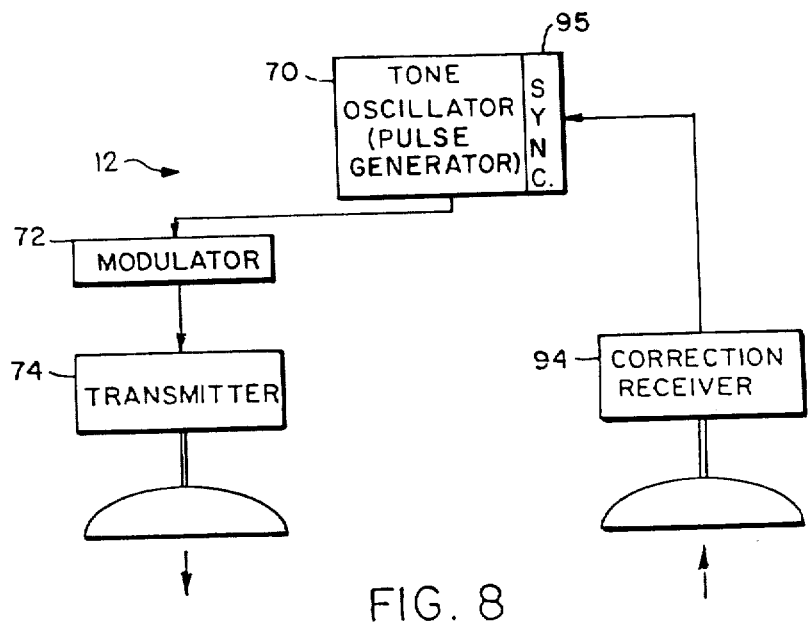
FIG. 8 is a block diagram of the electrical components of the satellites of the second embodiment.
Figure 9:
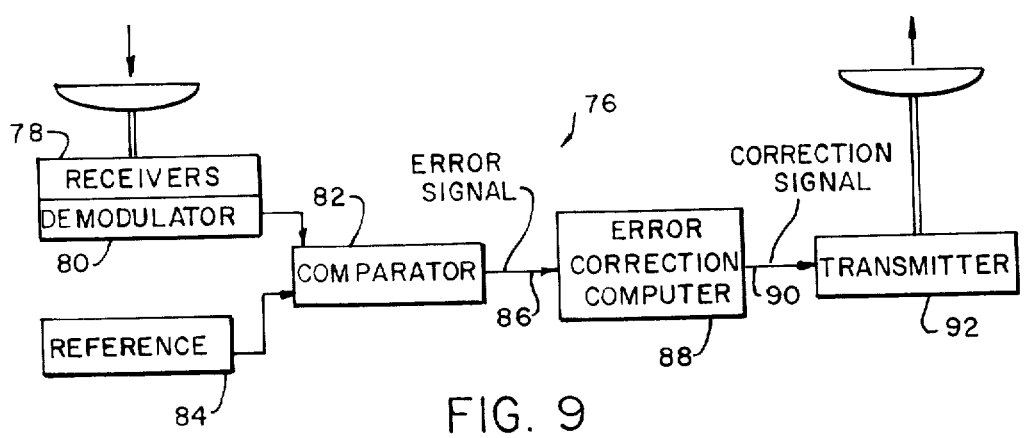
FIG. 9 is a block diagram of the electrical components of the ground station of the second embodiment of the phase control means.

In order to eliminate the need for the slave transmitters 32 and 34 on the master satellite 12A and the slave receivers 36 and slave transmitters 40 on each of the slave satellites 12B, 12C, 12D, 12E, 12F, 12G and 12H, a second embodiment of the means to accurately control the phase of the reference tones is shown in FIGS. 7-9. In the second embodiment, eight satellites 68 are uniformly positioned in geosynchronous orbit above the equator 14 of the earth 16. Each of the satellites 68 comprises a tone oscillator 70 which produces a reference tone which is frequency modulated by modulator 72. The output of modulator 72 is then transmitted by transmitter 74 to the earth 16. The receiver equipment located on the mobile craft 18 is similar to the receiver equipment as discussed previously and as shown in FIG. 6. Accordingly, determination of the geographical fix the mobile craft 18 is similar to the method discussed previously.

The phase control means of FIGS. 7-9 comprises a plurality of ground stations 76 positioned on the surface of the earth 16. Each ground station 76 comprises three receivers 78 which are tuned to receive transmissions from three of the satellites 68A, 68B and 68C. A demodulator 80 demodulates the radio carries thus received to obtain the three tones contained therein. The phases of the tones are then supplied to a comparator 82. Comparator 82 compares the differences in the phases of each tone with a reference phase supplied by phase reference 84 and produces an error signal 86 which is supplied to an error correction computer 88. Computer 88 computes a correction signal 90 which is transmitted by transmitter 92 to the three satellites 68A, 68B and 68C.

Each of the satellites 68 comprises a correction receiver 94 which receives the correction signal 90. The output of the correction receiver 94 is connected to a phase synchronizer 95 which synchronizes the phase of the tone produced by the tone oscillator with the reference phase produced by phase reference 84 in accordance with the correction signal 90 thus received. It should be apparent that since each of the ground stations 76 receives transmissions from these satellites 68, an overlap of the transmissions received from the ground stations 76 must occur, as shown in FIG. 7. Such overlapping is necessary to assure that each set of three satellites 68 controlled by a ground station 76 is synchronized with respect to one another.

Figure 10:
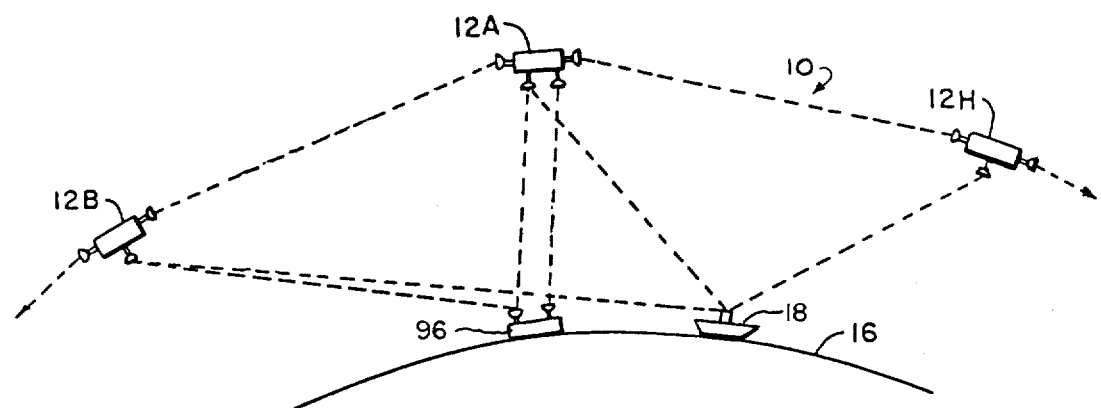
FIG. 10 is a plan view of the third embodiment of the invention.
Figure 11:
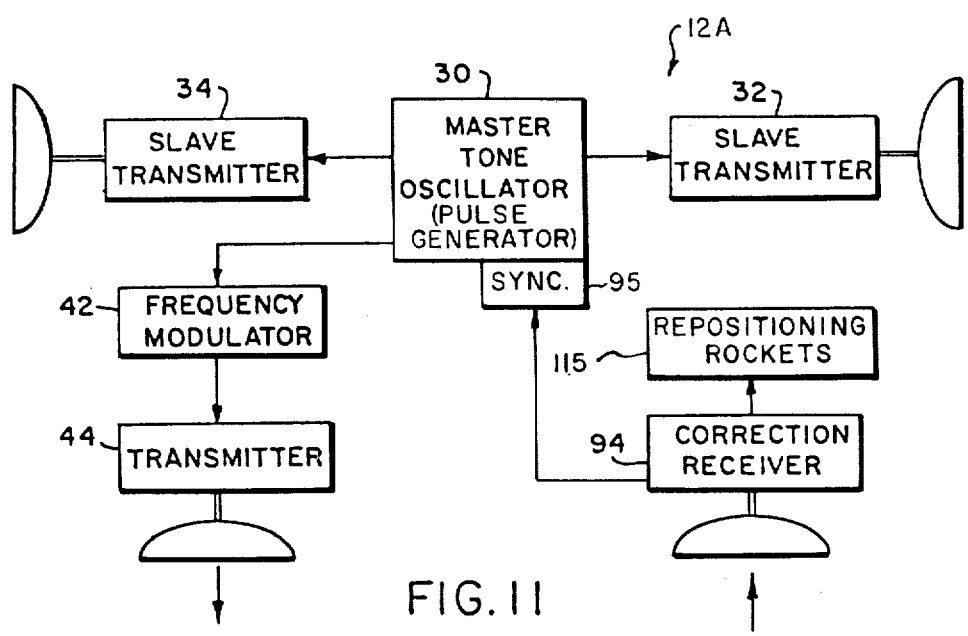
FIG. 11 is a block diagram of the electrical components of the master satellite of the third embodiment.
Figure 12:
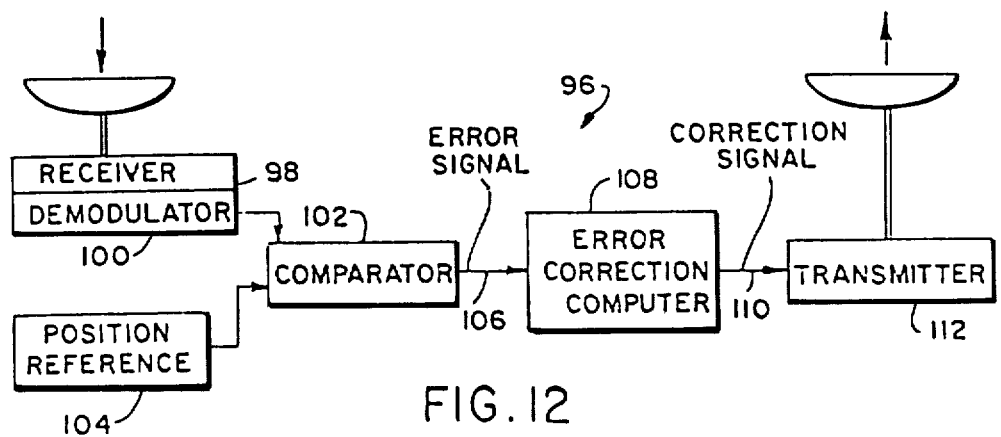
FIG. 12 is a block diagram of the electrical components of the ground station of the preferred embodiment of the invention.

After the satellites 12 are in geosynchronous orbit for a substantial period of time, the gravitational force exerted by the moon on the satellites 12 has a tendency to cause the satellites 12 to drift from their geosynchronous orbit. Since the satellites 12 must remain in geosynchronous orbit in order to accurately maintain their distance from the earth 16, a means to correct such drifts should be provided. FIGS. 10-12 illustrates such a correction means. The correction means is utilized in conjunction with the first embodiment of the phase control means as illustrated in FIGS. 1-6. More particularly, the master satellite 12A comprises a master tone oscillator 30 which produces a reference tone which is transmitted to the neighboring slave satellites 12B and 12H by slave transmitters 34 and 32, respectively. The slave satellites 12B and 12H then relay the reference tone to the remaining slave satellites as discussed previously.

The output of the master tone oscillator 30 is frequency modulated by modulator 42 and transmitted to the earth 16 by transmitter 44. Such transmission is received by a ground station 96 located on the surface of the earth 16. The ground station 96 comprises a receiver 98 which is tuned to the carrier frequency of transmitter 44 and to the carrier frequency of a slave satellite 12B. The output of receiver 98 is demodulated by demodulator 100 to recover the phase of the reference tones. The phases of such tones are supplied to comparator 102. Simultaneously, a position reference means 104 supplies a reference phase corresponding to the particular location of the master satellite 12A to the comparator 102. Comparator 102 compares the difference between such phases and produces an error signal 106 therefrom. The error signal 106 is supplied to an error correction computer 108 which computes a correction signal 110 which is then transmitted by transmitter 112 to the master satellite 12A. The correctional signal 110 is received by a correction receiver 94 of the master satellite 12A. The correction receiver 94 determines from the correction signal 110 the appropriate action which must be taken in order to place the master satellite 12A into its proper geosynchronous orbit. For example, the correction receiver 94 could actuate positioning rockets 115 which force the master satellite 12A into a proper orbit. The correction signal 110 is further supplied to the master tone oscillator 30 to be transmitted by the slave transmitters 34 and 32 to the neighboring slave satellites 12B, 12C, 12D, 12E, 12F, 12G and 12H. Accordingly, all of the slave satellites could then be repositioned into their respective proper geosynchronous orbit by means of similar positioning rockets.

Figure 13:
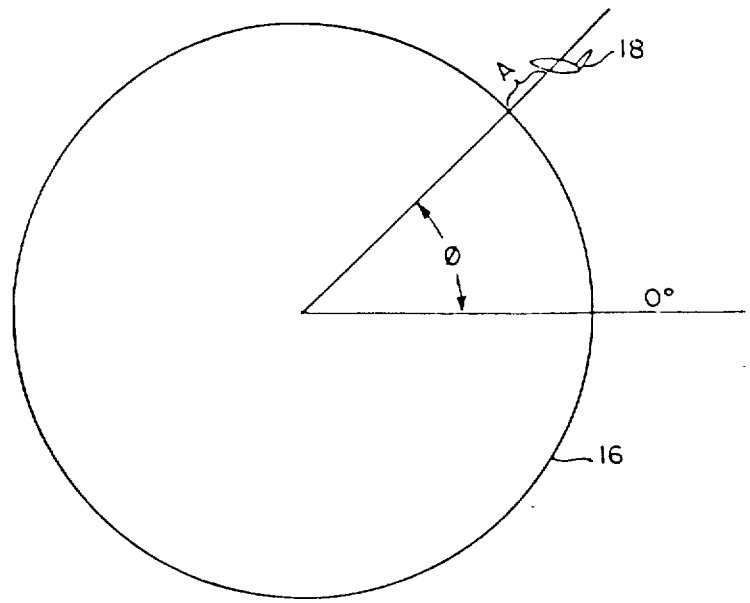
FIG. 13 illustrates the error associated with airborne mobile craft.
Figure 14:
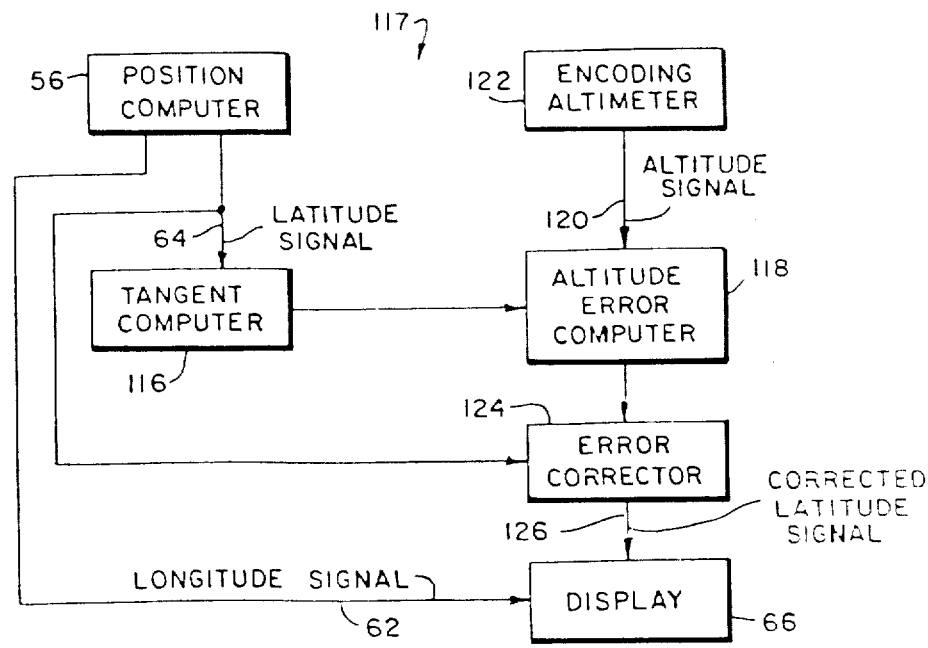
FIG. 14 is a block diagram of the electrical components of the means to correct the error associated with airborne mobile craft.

It should be noted that in a situation where the mobile craft 18 is airborne, an error will exist due to the fact that the airborne craft 18 will appear to be at a higher latitude as seen from the satellites 12 than when the craft 18 is on the surface of the earth 16. As shown in FIG. 13, the error is approximately equal to A (tan $\phi$), where A equals the airborne craft's 18 altitude and $\phi$ equals the craft's 18 latitude. A means for correcting such an error is shown in FIG. 14. The correction means 117 is located on the craft 18 and comprises the latitude signal 64 determined by the position computer (see FIG. 6) being supplied to a tangent computer 116 for computation of the tangent of the latitude signal 64. The output of the tangent comparator 116 is then supplied to an altitude error computer 118. Simultaneously, the altitude signal output 120 of an encoding altimeter 122, which is commonly found on most aircraft, is supplied to the altitude error computer 118. Computer 118 multiplies the tangent of the latitude signal 64 with the altitude signal 120 and supplies the result to an error corrector 124. The error corrector 124 subtracts the output of the altitude error computer 118 to the latitude signal 64 to determine a corrected latitude signal 126 which is supplied to the display 66. Accordingly, display 66 displays the longitude signal 62 and the corrected latitude signal 126.

Although the above discussion has described a navigational system 10 which utilizes frequency modulation for transmission of the various tones, it should be apparent that pulse modulation could alternatively be used. More particularly, the timing of the pulses between the satellites 12 could be carefully controlled enabling the receiver equipment on the mobile craft 18 to measure such pulse timing received from three of the satellites 12 for defining hyperbolic LOPs to obtain a geographical fix. Each satellite 12 would transmit such pulses on a separate frequency such that the receiver equipment on the mobile craft 18 could determine which satellite 12 is being received. Accordingly, the use of pulse modulation in lieu of frequency modulation does not depart from the spirit and scope of this invention.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described:
What is claimed is:
1. A navigational system for determining the position of a mobile craft, comprising in combination:
 a master satellite disposed in geosynchronous orbit above the earth;
 a plurality of slave satellites disposed in geosynchronous orbit above the earth;
 a master tone oscillator disposed on said master satellite for producing a reference tone;
 a master-to-slave transmitter means disposed on said master satellite for transmitting the reference tone to said slave satellites;
 a slave receiver means disposed on each said slave satellite for receiving the reference tone;
 a slave tone oscillator disposed on each said slave satellite;
 means for synchronizing the phase of the output of each said slave tone oscillator to the phase of the reference tone;
 a slave-to-craft transmitter means disposed on each said slave satellite for transmitting a carrier frequency modulated by the output of each of said slave tone oscillator to the earth;
 a master-to-craft transmitter means disposed on said master satellite for transmitting a carrier frequency modulated by the output of said master tone oscillator to the earth;
 a first craft receiver means disposed on the mobile craft for receiving said demodulating transmissions from a first said slave-to-craft transmitter means to recover a first tone;
 a second craft receiver means disposed on the mobile craft for receiving and demodulating transmissions from a second said slave-to-craft transmitter means to recover a second tone;
 a third craft receiver means disposed on the mobile craft for receiving and demodulating transmissions from said master-to-craft transmitter means or a third said slave-to-craft transmitter means to recover a third tone;
 a first comparator means disposed on the mobile craft for comparing the relative phase difference between said first and second tones;
 a first LOP computer means disposed on the mobile craft for computing a first hyperbolic line of position from the output of said first comparator means;
 a second comparator means disposed on the mobile craft for comparing the relative phase difference between said second and third tones;

a second LOP computer means disposed on the mobile craft for computing a second hyperbolic line of position from the output of said second comparator means;

a position computer means disposed on the mobile craft for determining the position of the mobile craft by computing the intersection of the first hyperbolic line of position and the second hyperbolic line of position;

means for displaying the output of said position computer means;

means for correcting the error associated with airborne mobile craft, comprising in combination:

the output of said position computer means including a latitude signal and a longitude signal;

a tangent computer for receiving said latitude signal and for determining the tangent of said latitude signal;

an altitude error computer for receiving the output of said tangent computer;

said altitude error computer further receiving an altitude signal from an encoding altimeter disposed on the airborne mobile craft;

said altitude error computer comprising means for multiplying the altitude signal with the output of said tangent computer;

an error corrector computer for receiving said latitude signal and the output of said altitude error computer;

said error corrector computer comprising means for subtracting the output of said altitude error computer from said latitude signal to produce a corrected latitude signal; and said display means comprising means for displaying said longitude signal from said position computer means and said corrected latitude signal from said error corrector computer.

2. A navigational system for determining the position of a mobile craft, comprising in combination:

a master satellite disposed in geosynchronous orbit above the earth;

a plurality of slave satellites disposed in geosynchronous orbit above the earth;

a master tone oscillator disposed on said master satellite for producing a reference tone;

a master-to-slave transmitter means disposed on said master satellite for transmitting the reference tone to said slave satellites;

a slave receiver means disposed on each said slave satellite for receiving the reference tone;

a slave tone oscillator disposed on each said slave satellite;

means for synchronizing the phase of the output of each said slave tone oscillator to the phase of the reference tone;

a slave-to-craft transmitter means disposed on each said slave satellite for transmitting a carrier frequency modulated by the output of each said slave tone oscillator to the earth;

a master-to-craft transmitter means disposed on said master satellite for transmitting a carrier frequency modulated by the output of said master tone oscillator to the earth;

a first craft receiver means disposed on the mobile craft for receiving said demodulating transmissions from a first said slave-to-craft transmitter means to recover a first tone;

a second craft receiver means disposed on the mobile craft for receiving and demodulating transmissions from a second said slave-to-craft transmitter means to recover a second tone;

a third craft receiver means disposed on the mobile craft for receiving and demodulating transmissions from said master-to-craft transmiter means or a third said slave-to-craft transmitter means to recover a third tone;

a first comparator means disposed on the mobile craft for comparing the relative phase difference between said first and second tones;

a first LOP computer means disposed on the mobile craft for computing a first hyperbolic line of position from the output of said first comparator means;

a second comparator means disposed on the mobile craft for comparing the relative phase difference between said second and third tones;

a second LOP computer means disposed on the mobile craft for computing a second hyperbolic line of position from the output of said second comparator means;

a position computer means disposed on the mobile craft for determining the position of the mobile craft by computing the intersection of the first hyperbolic line of position and the second hyperbolic line of position;

means for displaying the output of said position computer means;

a ground station disposed on the earth for receiving and demodulating transmissions from said master-to-craft transmitter means and one of said slave-to-craft transmitter means;

a ground station receiver means disposed on said ground station for receiving and demodulating transmissions from said master-to-craft transmitter means and one of said slave-to-craft transmitter means;

a position reference means disposed on said ground station for producing a position reference;

a third comparator means disposed on said ground station for comparing the relative phase differences among the two transmissions received by said ground station receiver means and the output of said position reference means;

an error correction computer means for receiving the output of said third comparator means and computing a correction signal for transmitting to said master satellite;

a ground station transmitter disposed on said ground station for transmitting the correction signal to said master satellite;

a correction receiver means disposed on said master satellite for receiving the correction signal transmitted by said ground station transmitter means; and means for repositioning said master satellite and said slave satellite into proper geosynchronous orbits by an amount determined by the correction signal.

3. A navigational system for determining the position of a mobile craft, comprising in combination:

a plurality of satellites disposed in geosynchronous orbit above the earth;

a tone oscillator disposed on each said satellite for producing a tone;

a satellite-to-craft transmitter means disposed on each said satellite for transmitting a carrier frequency modulated by the tone to the earth;

a first craft receiver means disposed on the mobile craft for receiving and demodulating transmissions from a first said satellite-to-craft transmitter means to recover a first tone;

a second craft receiver means disposed on the mobile craft for receiving and demodulating transmissions from a second said satellite-to-craft transmitter means to recover a second tone;

a third craft receiver means disposed on the mobile craft for receiving and demodulating transmissions from a third said satellite-to-craft transmitter means to recover a third tone;

a first comparator means disposed on the mobile craft for comparing the relative phase difference between said first and second tones;

a first LOP computer means disposed on the mobile craft for computing a first hyperbolic line of position from the output of said first comparator means;

a second comparator means disposed on the mobile craft for comparing the relative phase difference between said second and third tones;

a second LOP computer means disposed on the mobile craft for computing a second hyperbolic line of position from the output of said first comparator means;

a position computer means disposed on the mobile craft for determining the position of the mobile craft based upon the output of said first LOP computer means and said second LOP computer means;

means for displaying the output of said position computer means;

a plurality of ground stations disposed on the earth enabling said ground stations to receive transmissions from at least two of said satellite-to-craft transmitter means;

a ground station receiver means disposed on each said ground station for receiving said demodulating transmissions from at least two of said satellite-to-craft transmitter means;

a phase reference means disposed on each said ground station for producing a phase reference;

a third comparator means disposed on each said ground station for comparing the relative phase difference among the two transmissions received by said ground station receiver means and the output of said phase reference means;

an error correction means for receiving the output of said third comparator means and producing a correction signal to correct the phase difference of said tone oscillators;

a ground station transmitter means disposed on each said ground station for transmitting the correction signal to said satellites;

a correction receiver means disposed on each said satellite for receiving the correction signal transmitted by said ground station transmitter means; and means for correcting the phase of the output of said tone oscillators by an amount determined by the correction signal.

4. The navigational system as set forth in claim 3, wherein each said satellite-to-craft transmitter means comprises means for being frequency modulated by each said tone oscillator;

each said satellite-to-craft transmitter means transmitting on a different carrier frequency; and said first craft receiver means, said second craft receiver means and said third craft receiver means comprising means for being tuned to the frequency of the three transmissions received from said satellite-to-craft transmitter means.

5. The navigational system as set forth in claim 3, including means for correcting the error associated with airborne mobile craft, comprising in combination:

the output of said position computer means including a latitude signal and a longitude signal;

a tangent computer for receiving said latitude signal and for determining the tangent of said latitude signal;

an altitude error computer for receiving the output of said tangent computer;

said altitude error computer further receiving an altitude signal from an encoding altimeter disposed on the airborne mobile craft;

said altitude error computer comprising means for multiplying the altitude signal with the output of said tangent computer;

an error corrector computer for receiving said latitude signal and the output of said altitude error computer;

said error corrector computer comprising means for subtracting the output of said altitude error computer from said latitude signal to produce a corrected latitude signal; and said display means comprising means for displaying said longitude signal from said position computer means and said corrected latitude signal from said error corrector computer.

6. A navigational system for determining the position of a mobile craft, comprising in combination:

a master satellite disposed in geosynchronous orbit above the earth;

a plurality of slave satellites disposed in geosynchronous orbit above the earth;

a master pulse generator disposed on said master satellite for producing reference pulses;

a master-to-slave transmitter means disposed on said master satellite for transmitting the reference pulses to said slave satellites;

a slave receiver means disposed on each said slave satellite for receiving the reference pulses;

a slave pulse generator disposed on each said slave satellite;

means for synchronizing the pulse timing of the output of each said pulse generator to the pulse timing of the reference pulses;

a slave-to-craft transmitter means disposed on each said slave satellite for transmitting a carrier frequency modulated by the output of each said slave pulse generator to the earth;

a master-to-craft transmitter means disposed on said master satellite for transmitting a carrier frequency modulated by the output of said master pulse generator to the earth;

a first craft receiver means disposed on the mobile craft for receiving and demodulating transmissions from a first said slave-to-craft transmitter means;

a second craft receiver means disposed on the mobile craft for receiving and demodulating transmissions from a second said slave-to-craft transmitter means;

a third craft receiver means disposed on the mobile craft for receiving and demodulating transmissions from said master-to-craft transmitter means or a third said slave-to-craft transmitter means;

a first comparator means disposed on the mobile craft for comparing the relative pulse timing between the two transmissions received and demodulated by said first craft receiver means and said second craft receiver means;

a first LOP computer means disposed on the mobile craft for computing a first hyperbolic line of position from the output of said first comparator means;

a second comparator means disposed on the mobile craft for comparing the relative pulse timing between the two transmissions received and demodulated by said second craft receiver means and said third craft receiver means;

a second LOP computer means disposed on the mobile craft for computing a second hyperbolic line of position from the output of said second comparator means;

a position computer means disposed on the mobile craft for determining the position of the mobile craft by computing the intersection of the first hyperbolic line of position and the second hyperbolic line of position;

means for displaying the output of said position computer means;

means for correcting the error associated with airborne mobile craft, comprising in combination:

the output of said position computer means including a latitude signal and a longitude signal;

a tangent computer for receiving said latitude signal and for determining the tangent of said latitude signal;

an altitude error computer for receiving the output of said tangent computer;

said altitude error computer further receiving an altitude signal from an encoding altimeter disposed on the airborne mobile craft;

said altitude error computer comprising means for multiplying the altitude signal with the output of said tangent computer;

an error corrector computer for receiving said latitude signal and the output of said altitude error computer;

said error corrector computer comprising means for subtracting the output of said altitude error computer from said latitude signal to produce a corrected latitude signal; and said display means comprising means for displaying said longitude signal from said position computer means and said corrected latitude signal from said error corrector computer.

7. A navigational system for determining the position of a mobile craft, comprising in combination:

a master satellite disposed in geosynchronous orbit above the earth;

a plurality of slave satellites disposed in geosynchronous orbit above the earth;

a master pulse generator disposed on said master satellite for producing reference pulses;

a master-to-slave transmitter means disposed on said master satellite for transmitting the reference pulses to said slave satellites;

a slave receiver means disposed on each said slave satellite for receiving the reference pulses;

a slave pulse generator disposed on each said slave satellite;

means for synchronizing the pulse timing of the output of each said pulse generator to the pulse timing of the reference pulses;

a slave-to-craft transmitter means disposed on each said slave satellite for transmitting a carrier frequency modulated by the output of each said slave pulse generator to the earth;

a master-to-craft transmitter means disposed on said master satellite for transmitting a carrier frequency modulated by the output of said master pulse generator to the earth;

a first craft receiver means disposed on the mobile craft for receiving and demodulating transmissions from a first said slave-to-craft transmitter means;

a second craft receiver means disposed on the mobile craft for receiving and demodulating transmissions from a second said slave-to-craft transmitter means;

a third craft receiver means disposed on the mobile craft for receiving and demodulating transmissions from said master-to-craft transmitter means or a third said slave-to-craft transmitter means;

a first comparator means disposed on the mobile craft for comparing the relative pulse timing between the two transmissions received and demodulated by said first craft receiver means and said second craft receiver means;

a first LOP computer means disposed on the mobile craft for computing a first hyperbolic line of position from the output of said first comparator means;

a second comparator means disposed on the mobile craft for comparing the relative pulse timing between the two transmissions received and demodulated by said second craft receiver means and said third craft receiver means;

a second LOP computer means disposed on the mobile craft for computing a second hyperbolic line of position from the output of said second comparator means;

a position computer means disposed on the mobile craft for determining the position of the mobile craft by computing the intersection of the first hyperbolic line of position and the second hyperbolic line of position;

means for displaying the output of said position computer means;

a ground station disposed on the earth for receiving and demodulating transmissions from said master-to-craft transmitter means and one of said slave-to-craft transmitter means;

a ground station receiver means disposed on said ground station for receiving and demodulating transmissions from said master-to-craft transmitter means and one of said slave-to-craft transmitter means;

a position reference means disposed on said ground station for producing a position reference;

a third comparator means disposed on said ground station for comparing the relative pulse timing among the two transmissions received by said ground station receiver means and the output of said position reference means;

an error correction computer means for receiving the output of said third comparator means and computing a correction signal for transmitting to said master satellite;

a ground station transmitter means disposed on said ground station for transmitting the correction signal to said master satellite;

a correction receiver means disposed on said master satellite for receiving the correction signal transmitted by said ground station transmitter means; and means for repositioning said master satellite and said slave satellite into proper geosynchronous orbits by an amount determined by the correction signal.

8. The navigational system as set forth in claim 7, including means for correcting the error associated with airborne mobile craft, comprising in combination:

the output of said position computer means including a latitude signal and a longitude signal;

a tangent computer for receiving said latitude signal and for determining the tangent of said latitude signal;

an altitude error computer for receiving the output of said tangent computer;

said altitude error computer further receiving an altitude signal from an encoding altimeter disposed on the airborne mobile craft;

said altitude error computer comprising means for multiplying the altitude signal with the output of said tangent computer;

an error corrector computer for receiving said latitude signal and the output of said altitude error computer;

said error corrector computer comprising means for subtracting the output of said altitude error computer from said latitude signal to produce a corrected latitude signal; and said display means comprising means for displaying said longitude signal from said position computer means and said corrected latitude signal from said error corrector computer.

9. A navigational system for determining the position of a mobile craft, comprising in combination;

a plurality of satellites disposed in geosynchronous orbit above the earth;

a pulse generator disposed on each said satellite for producing pulses;

a satellite-to-craft transmitter means disposed on each said satellite for transmitting a carrier frequency modulated by the pulses to the earth;

a first craft receiver means disposed on the mobile craft for receiving and demodulating transmissions from a first said satellite-to-craft transmitter means;

a second craft receiver means disposed on the mobile craft for receiving and demodulating transmissions from a second said satellite-to-craft transmitter means;

a third craft receiver means disposed on the mobile craft for receiving and demodulating transmissions from a third said satellite-to-craft transmitter means;

a first comparator means disposed on the mobile craft for comparing the relative pulse timing between the transmissions received and demodulated by said first craft receiver means and said second craft receiver means;

a first LOP Computer means disposed on the mobile craft for computing a first hyperbolic line of position from the output of said first comparator means;

a second comparator means disposed on the mobile craft for comparing the relative pulse timing between the transmissions received and demodulated by said second craft receiver means and said third craft receiving means;

a second LOP computer means disposed on the mobile craft for computing a second hyperbolic line of position from the output of said first comparator means;

a position computer means disposed on the mobile craft for determining the position of the mobile craft based upon the output of said first LOP computer means and said second LOP computer means;

means for displaying the output of said position computer means;

a plurality of ground stations disposed on the earth enabling said ground stations to receive transmissions from at least two of said satellite-to-craft transmitter means;

a ground station receiver means disposed on each said ground station for receiving and demodulating transmissions from at least two of said satellite-to-craft transmitter means;

a pulse timing reference means disposed on each said ground station for producing a pulse timing reference;

a third comparator means disposed on each said ground station for comparing the relative pulse timing among the two transmissions received by said ground station receiver means and the output of said pulse timing reference means;

an error correction means for receiving the output of said third comparator means and producing a correction signal to correct the relative pulse timing of said pulse generators;

a ground station transmitter means disposed on each said ground station for transmitting the correction signal to said satellites;

a correction receiver means disposed on each said satellite for receiving the correction signal transmitted by said ground station transmitter means; and means for correcting the pulse timing of the output of said pulse generator by an amount determined by the correction signal.

10. The navigational system as set forth in claim 9, wherein each said satellite-to-craft transmitter means comprises means for being pulse modulated by each said pulse generator;

each said satellite-to-craft transmitter means transmitting on different carrier frequencies; and said first craft receiving means, said second craft receiver means and said third receiver means comprising means for being tuned to the frequency of the three transmissions received from said satellite-to-craft transmitter means.

11. A navigational system for determining the position of a mobile craft upon receiving transmissions from at least three of a plurality of satellites disposed in geosynchronous orbit above the earth, each transmission including a different carrier frequency which is modulated by a tone, each tone having substantially identical phases with one another, comprising in combination:

a first craft receiver means disposed on the mobile craft for receiving and demodulating transmissions from a first satellite to recover a first tone;

a second craft receiver means disposed on the mobile craft for receiving and demodulating transmissions from a second satellite to recover a second tone;

a third craft receiver means disposed on the mobile craft for receiving and demodulating transmissions from a third satellite to recover a third tone;

a first comparator means disposed on the mobile craft for comparing the relative phase difference between said first and second tones;

a first LOP computer means disposed on the mobile craft for computing a first hyperbolic line of position from the output of said first comparator means;

a second comparator means disposed on the mobile craft for comparing the relative phase difference between said second and third tones;

a second LOP computer means disposed on the mobile craft for computing a second hyperbolic line of position from the output of said second comparator means;

a position computer means disposed on the mobile craft for determining the position of the mobile craft based upon the output of said first LOP computer means and said second LOP computer means;

means for displaying the output of said position computer means;

means for correcting the error associated with airborne mobile craft, comprising in combination:

the output of said position computer means including a latitude signal and a longitude signal;

a tangent computer for receiving said latitude signal and for determining the tangent of said latitude signal;

an altitude error computer for receiving the output of said tangent computer;

said altitude error computer further receiving an altitude signal from an encoding altimeter disposed on the airborne mobile craft;

said altitude error computer comprising means for multiplying the altitude signal with the output of said tangent computer;

an error corrector computer for receiving said latitude signal and the output of said altitude error computer;

said error corrector computer comprising means for subtracting the output of said altitude error computer from said latitude signal to produce a corrected latitude signal; and said display means comprising means for displaying said longitude signal from said position computer means and said corrected latitude signal from said error corrector computer.

12. The navigational system for determining the position of a mobile craft upon receiving transmissions from at least three of a plurality of satellites disposed in geosynchronous orbit above the earch, each transmission having different frequencies and being pulse modulated by identical frequencies, comprising in combination:

a first craft receiver means disposed on the mobile craft for receiving and demodulating transmissions from at least a first satellite;

a second craft receiver means disposed on the mobile craft for receiving and demodulating transmissions from a second satellite;

a third craft receiver means disposed on the mobile craft for receiving and demodulating transmissions from a third satellite;

a first comparator means disposed on the mobile craft for comparing the relative pulse timing between the two transmissions received and demodulated by said first craft receiver means and said second craft receiver means;

a first LOP computer means disposed on the mobile craft for computing a first hyperbolic line of position from the output of said first comparator means;

a second comparator means disposed on the mobile craft for comparing the relative pulse timing between the transmissions received and demodulated by said second craft receiver means and said third craft receiver means;

a second LOP comparator means disposed on the mobile craft for comparing a second hyperbolic line of position from the output of said second comparator means;

a position computer means disposed on the mobile craft for determining the position of the mobile craft based upon the output of said first LOP computer means and said second LOP computer means;

means for displaying the output of said position computer means;

means for correcting the error associated with airborne mobile craft, comprising in combination:

the output of said position computer means including a latitude signal and a longitude signal;

a tangent computer for receiving said latitude signal and for determining the tangent of said latitude signal;

an altitude error computer for receiving the output of said tangent computer;

said altitude error computer further receiving an altitude signal from an encoding altimeter disposed on the airborne mobile craft;

said altitude error computer comprising means for multiplying the altitude signal with the output of said tangent computer;

an error corrector computer for receiving said latitude signal and the output of said altitude error computer;

said error corrector computer comprising means for subtracting the output of said altitude error computer from said latitude signal to produce a corrected latitude signal; and said display means comprising means for displaying said longitude signal from said position computer means and said corrected latitude signal from said error corrector computer.

* * * * *